United States Patent [19]

Kimura et al.

[11] Patent Number: 4,873,591
[45] Date of Patent: Oct. 10, 1989

[54] TAPE LOADING DEVICE HAVING PAIR OF TAPE GUIDE POST UNITS ON PAIR OF ROTATABLE MEMBERS

[75] Inventors: Takashi Kimura; Toshiya Yatomi; Hiroo Edakubo, all of Kanagawa, Japan

[73] Assignee: Canon Kabushiki Kaisha, Tokyo, Japan

[21] Appl. No.: 89,136

[22] Filed: Aug. 25, 1987

[30] Foreign Application Priority Data

| Aug. 28, 1986 [JP] | Japan | 61-20214 |
| Aug. 28, 1986 [JP] | Japan | 61-202020 |
| Aug. 28, 1986 [JP] | Japan | 61-202021 |
| Aug. 28, 1986 [JP] | Japan | 61-202022 |
| Aug. 28, 1986 [JP] | Japan | 61-202023 |

[51] Int. Cl.⁴ ......................................... G11B 15/665
[52] U.S. Cl. .................................................... 360/85
[58] Field of Search ............................... 360/85, 95

[56] References Cited

U.S. PATENT DOCUMENTS

| 4,658,310 | 4/1987 | Kimura | 360/85 |
| 4,748,521 | 5/1988 | Osawa et al. | 360/85 |
| 4,751,592 | 6/1988 | Hutter et al. | 360/85 |

Primary Examiner—Robert S. Tupper
Attorney, Agent, or Firm—Robin, Blecker, Daley & Driscoll

[57] ABSTRACT

A record bearing medium loading device having first and second guide post units each including a guide post for guiding a tape-shaped record bearing medium loads the tape-shaped record bearing medium in a predetermined position by moving the first and second guide post units in the circumferential direction and then catching them at different positions, in which the connecting state of first and second rotatable ring members holding the first and second guide post units, respectively, is once released and then recovered according to the rotating phase of the first and second rotatable ring members.

7 Claims, 8 Drawing Sheets

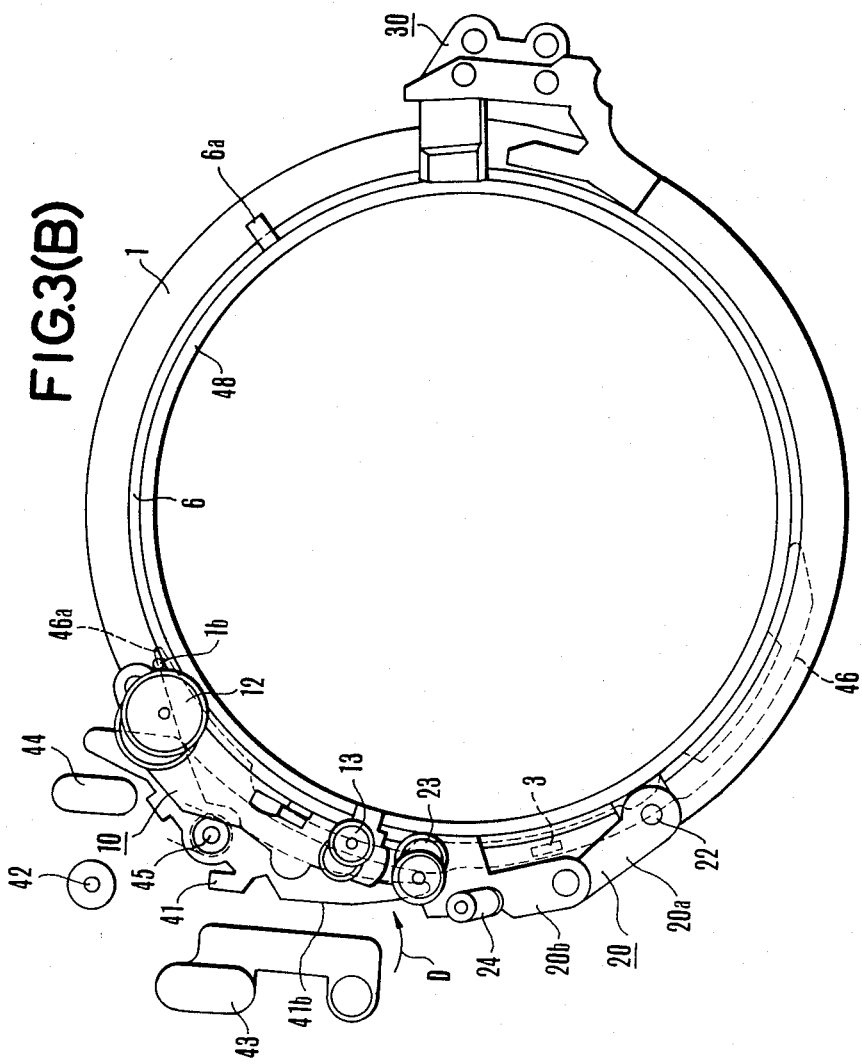

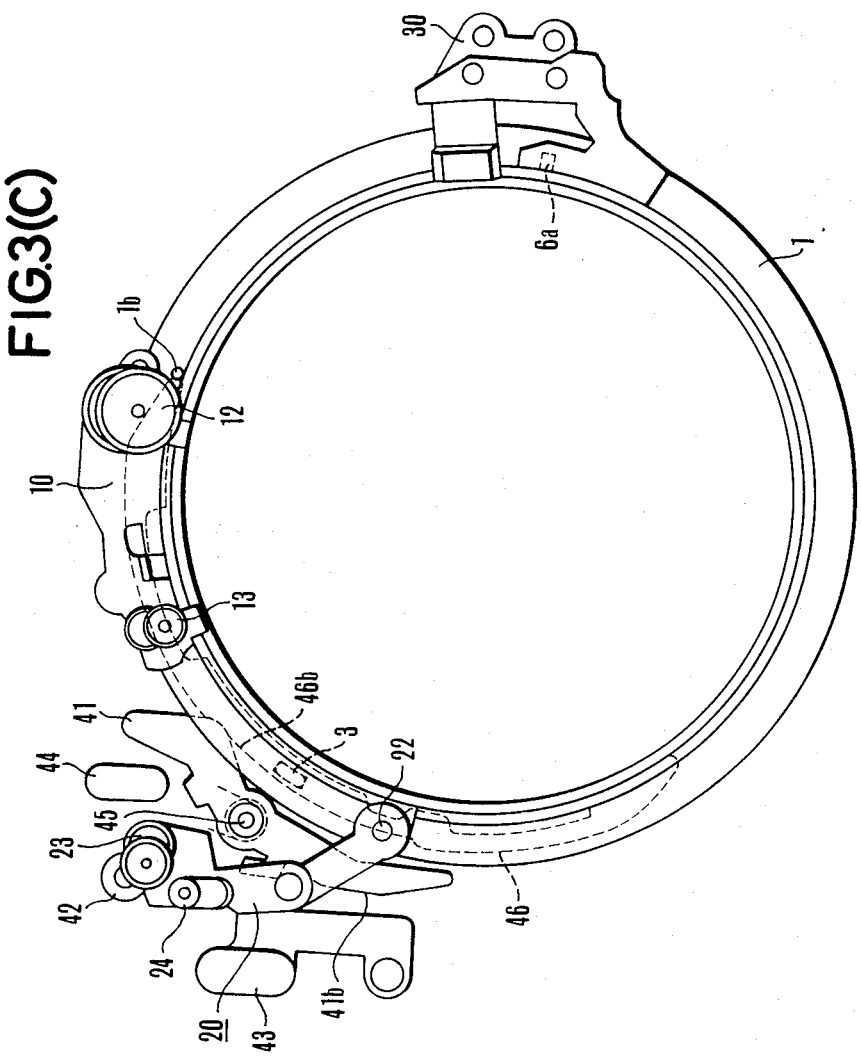

4,873,591

TAPE LOADING DEVICE HAVING PAIR OF TAPE GUIDE POST UNITS ON PAIR OF ROTATABLE MEMBERS

BACKGROUND OF THE INVENTION

1. Field of the Invention

This invention relates to a record bearing medium loading device for loading a tape-shaped record bearing medium in a predetermined position.

2. Description of the Related Art

As the loading device of this kind, there is a tape loading device for use in video tape recorders (VTRs). Taking an example of this tape loading device, the following discussion is conducted.

The tape transportation systems for VTRs have conventionally had their form almost generally standardized according to the type of VTR. With the recent trend of reducing the size of the VTR as a momentum, however, development of new tape transportation systems has become prosperous. One of them is exemplified in FIG. 1.

FIG. 1 is a top view of an example of the above-described recently developed tape transportation system for the VTR. In the figure, 51 is a rotary head cylinder having a rotary head on the outer periphery thereof. Movable guide posts 53a and 53b constitute a first guide post unit 53. Another movable guide posts 55a and 55b constitute a second guide post unit 55. A magnetic tape T from a supply reel 71 is transported to a take-up reel 72 through a path defined by the aforesaid two units 53 and 55, fixed guide posts 73 to 77, another movable guide post 78, a capstan 79, a pinch roller 80 movable together with the movable guide post 78, and a tape tension control pin 81.

When to load the tape T in such a predetermined path, the first and second movable guide post units 53 and 55 pull the tape T out of an opening portion of the cassette (not shown) which contains both reels 71 and 72. Having reached the illustrated position, they are arrested and held stationary by catching members (not shown).

In the loaded position, the training of the tape T around the cylinder 51 must be conditioned with the height of the tape T in such a fashion that it is raised toward the entrance, and then lowered to the same level as the take-up reel 72. Such a tape loading method is advantageous at reducing the height of the VTR. So, this method is employed in the tape transportation system of FIG. 1.

In this type of system, the duty of giving the tape T a lifting vector is put on the second guide post unit. It is, therefore, very important for the movable guide posts 55a and 55b to maintain stable the running of the tape T. Hence, the catching of them should be so rigorous as to ensure the designed accuracy of the position and inclination of the tape T.

FIG. 2 illustrates the construction and arrangement of the essential parts of a loading device for establishing the running path in the transportation system of FIG. 1. In the figure, 51 is the rotary head cylinder. The loading device includes a first loading ring 52, the first guide post unit 53 having the movable tape guide posts 53a and 53b provided therein to move along with that unit 53, a second loading ring 54, the second guide post unit 55 having the movable tape guide posts 55a and 55b provided therein to move along with that unit 55, a loading motor 56, a pinion 56a fixedly mounted on the output shaft of the loading motor 56, a gear 57 meshing with both of the pinion 56a and an outer gear of the first loading ring 52, another gear 58 meshing with both the gear 57 and an outer gear of the second loading ring 54, and two catchers 59a and 59b for the first and second guide post units 53 and 55 respectively. T is the magnetic tape.

In operating the device of such construction, when the loading motor 56 rotates, the first loading ring 52 is rotated through the pinion 56a and gear 57, and the second loading ring 54 is rotated a lesser angle or more slowly than the first loading ring 52 in the same direction through the speed reduction of the gears 57 and 58. When the loading is complete, the catchings of the first and second guide post units 53 and 55 by the catchers 59a and 59b respectively occur simultaneously.

This catching is carried out with the guide post units 53 and 55 being pressed against the catchers 59a and 59b by the charged force of springs 61 and 60, respectively.

In the above-described conventional type of loading device, in order to move the first and second guide post units 53 and 55, use is made of two loading rings 52 and 54 which are drivenly connected through the respective individual gears 57 and 58 to the common loading motor 56. Further, they are moved in different ways from each other. Also, during the movement of both guide post units 53 and 55, it is, in general, the first guide post unit 53 that has to be moved in its axial direction. For this purpose, there is provided a guide rail. On the other hand, in order to bring the second guide post unit 55 into abutting engagement on the catcher 59b, it is necessary for it to move away from the second loading ring 54. So, the second guide post unit 55 too has to be moved. In conclusion, the mechanism for operating these or first and second guide post units 53 and 55 is required to have two functions of differentiating their rotative and guiding movements from each other at a time, giving rise a problem that a desired reduction of the size and weight of the device can not be achieved.

In such a configuration, it is difficult to make smaller the diameters of the loading rings 52 and 54. To impart to the mechanism a furthermore function of controlling the relative phases of the two loading rings 52 and 54, the complexity of structure of that mechanism is increased. Thus, the problem for minimizing the size and weight is worsened.

If the aforesaid phases are not adjusted accurately when the first and second guide post units are caught, the good balance between the bias forces on them is broken.

Another problem for minimizing the weight of the device arises from the involvement of an increased number of parts, since the above-described conventional type of loading device is necessarily included with a guide member for directing the second guide post unit 55 to the catcher 59b when the catching is about to occur, a mechanism for moving that guide member to its operative position when the second guide post unit 55 nears it, and another mechanism for pressing the second guide post unit 55 against the catcher 59b.

Further, the above-described loading device, because of the necessity of charging the springs 60 and 61 at the time of catching, suffers from an excessive load on the loading motor. For this reason, as the motor 56, use has to be made of a large-size, expensive one.

SUMMARY OF THE INVENTION

An object of the present invention is to provide a record bearing medium loading device which can solve at least one of the above-described problems.

Another object is to provide a record bearing medium loading device having two guide post units to be located in respective different positions from each other, while still permitting a much desired reduction of the size and weight of the device to be achieved.

Under such objects, according to the present invention, as an embodiment thereof, a record bearing medium loading device is proposed, comprising first and second guide post units each including a guide post for guiding a tape-shaped record bearing medium, first and second rotary members holding the first and second guide post units respectively and for moving them between a non-contact position on the tape-shaped record bearing medium and a predetermined loading-completed position, a first connecting member for bringing the first and second rotary members into operative connection with each other, release means for releasing the first and second rotary members from the connection by the first connecting member depending on the phase of rotation of the first rotary member, and a second connecting member, operable under the condition that the first and second rotary members are released from the connection by the first connecting member, for bringing the first and second rotary members into operative connection with each other.

Another object of the invention is to provide a record bearing medium loading device having two guide post units carried on respective ring-shaped guide members in which the phases of rotation of the guide members can be accurately defined, and their outer diameters can be minimized.

Under such an object, according to the present invention, as an embodiment thereof, a record bearing medium loading device is proposed, comprising first and second guide post units each including a guide post for guiding a tape-shaped record bearing medium, first and second rotary members upon rotation to cause the first and second guide post units each between a non-contact position on the tape-shaped record bearing medium and a predetermined loading-completed position, a pivotal arm rotatably mounted on the second rotary member and holding the second guide post unit, and a guide ring for guiding the first guide post unit and for controlling the rotation of the pivotal arm.

Still another object of the invention is to realize a simplification of the mechanism for catching the guide post unit and a reduction of the number of parts.

Under such an object, according to the invention, as an embodiment thereof, a record bearing medium loading device is proposed, comprising a guide post unit including a guide post for guiding a tape-shaped record bearing medium, a rotary member holding the guide post unit for causing the guide post unit to move between a non-contact position on the tape-shaped record bearing medium and a predetermined loading-completed position, means for locating the guide post unit at the predetermined loading-completed position, a movable guide member for conducting the guide post unit to the locating means, bias means for urging the guide member in such a direction that the guide post unit is pressed on the locating means, and control means for controlling the position of the guide member between a place for conducting the guide post unit to the locating means and another place for pressing the guide post unit on the locating means by the force of the bias means.

A further object of the invention is to realize as far a reduction of the load necessary to the loading operation as possible, and a minimization of the size and weight of the device.

Under such an object, according to the invention, as an embodiment thereof, a record bearing medium loading device is proposed, comprising first and second guide post units each including a guide post for guiding a tape-shaped record bearing medium, first and second rotary members holding the first and second guide post units respectively for causing the first and second guide post units each to move between a non-contact position on the tape-shaped record bearing medium and a predetermined loading-completed position, first and second locating means for locating the first and second guide post units at respective predetermined positions, a pressor member for pressing the second guide post unit on the second locating means, bias means for urging the pressor member in a predetermined direction, and a cam formed as a unit on the first rotary member to control the operation of the pressor means by the bias means.

These and other objects and features of the invention will become apparent from the following detailed description of embodiments thereof with reference to the drawings:

BRIEF DESCRIPTION OF THE DRAWINGS

FIGS. 3(A), 3(B), 3(C) and 3(D) are top views illustrating the construction and arrangement of the essential parts of an embodiment of a loading device according to the invention in different operative positions.

DETAILED DESCRIPTION OF THE PREFERRED EMBODIMENTS

The construction and operation of an embodiment of the record bearing medium loading device according to the invention is next described by reference to FIGS. 3(A) to 6(B).

Figure 3A:
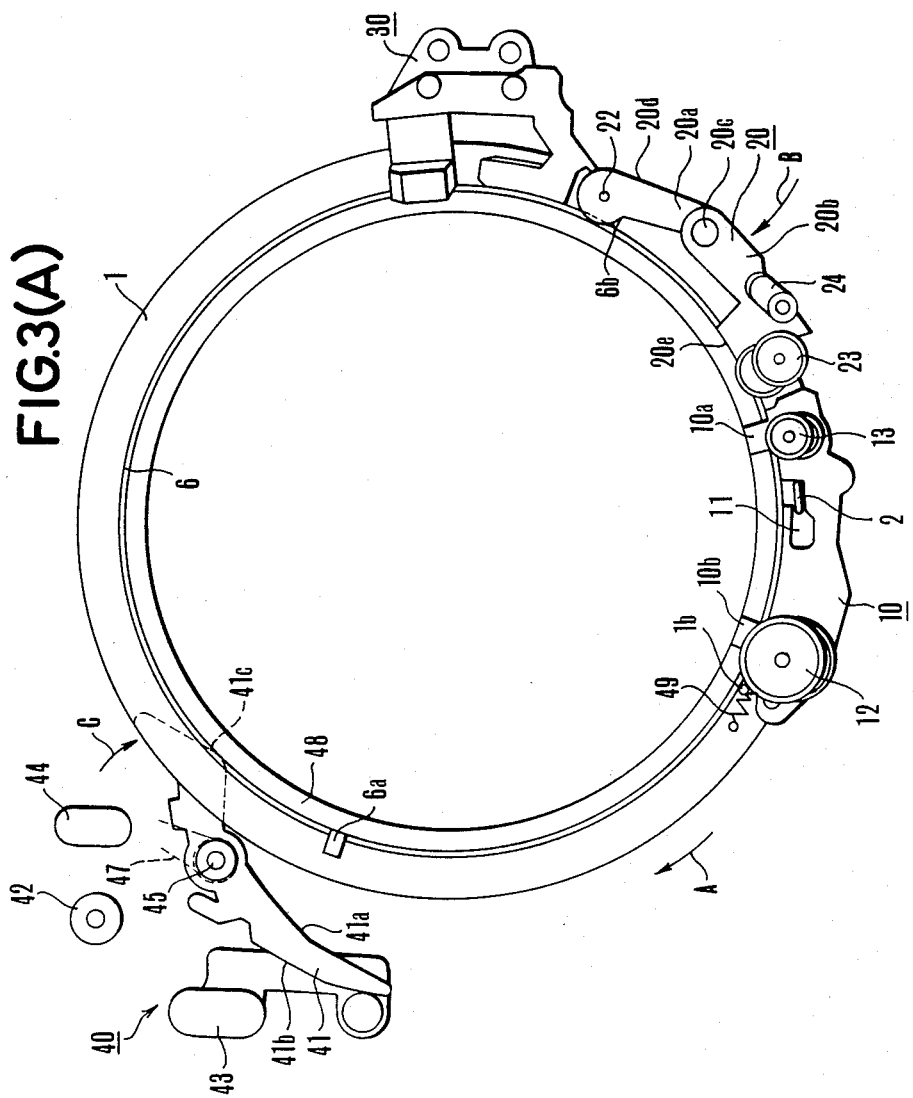

FIGS. 3(A), 3(B), 3(C) and 3(D) are views illustrating the construction and arrangement of the main parts of an embodiment of the loading device according to the invention. FIG. 3(A) illustrates a state before a loading is performed, FIGS. 3(B) and 3(C) states in the middle of the loading course, and FIG. 3(D) a state when the loading is completed In these figures, 1 is a loading ring. A follow-up ring 6 follows up the loading ring 1. These rings are arranged in superimposed relation as shown in the figures. 10 is a first guide post unit; 20 is a second guide post unit; 30 is a first catching structure for catching the first guide post unit 10; 40 is a second catching structure for catching the second guide post unit 20.

A protuberance 2 formed on a basement (not shown) which is fixedly secured to the loading ring 1 engages in a hole 11 bored in the first guide post unit 10 A spring 49 urges the first guide post unit 10 in a direction of arrow A in FIG. 3(A) to connect with the loading ring 1. The first guide post unit 10 has two legs 10a and 10b engaging a circular guide rail on a guide rail 48. Formed in the outer peripheral surface of the guide ring 48 is a cam on which a cam 20e abuts as will be more fully described later. Thereby, the first guide post unit 10 is made movable in the direction of rotation of the first loading ring 1 in fixed relation with the ring 1. Again, it is even in a direction perpendicular to this direction of rotation or to the paper that the unit 10 is movable relative to the loading ring 1 along the guide rail on the guide ring 48. Planted on the first guide post unit 10 are guide posts 12 and 13 for guiding a record bearing medium (for example magnetic tape).

The second guide post unit 20 has its arm 20a pivotally mounted about a pin 22 on a basement 6b which is mounted on the follow-up ring 6. Another arm 20b is pivotally mounted about a pin 20c on the free end of the first arm 20a and fixedly carries guide posts 23 and 24 for guiding the record bearing medium.

Figure 4A:
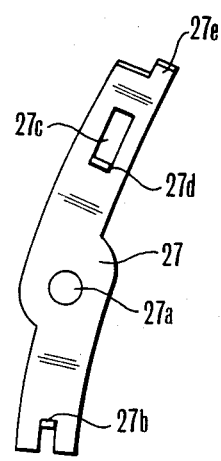
FIGS. 4(A) and 4(B) illustrate the details of the hook of FIG. 3(A).
Figure 4B:
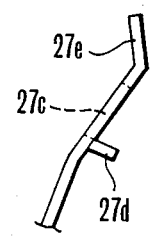
Figure 5A:
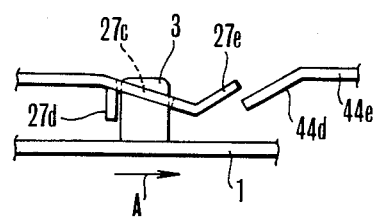
FIGS. 5(A) and 5(B) are side elevational views illustrating how the hook and loading ring of FIG. 3(A) come to engage each other.
Figure 5B:
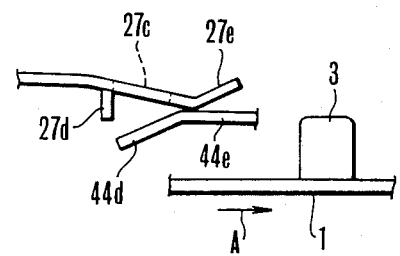

Again, the second guide post unit 20 has a hook 27 (see FIGS. 4(A) and 4(B)) with its hole 27a fitted on the shaft 22. Both ends of a torsion coil spring (not shown) are connected to a side edge 20d of the first arm 20a and a finger 27b of the hook 27. This torsion coil spring turns round the shaft 22, urging the first arm 20a in a direction of arrow B in FIG. 3(A).

The hook 27 has a resilient property and is formed to, for example, such a shape as shown in FIG. 4(A) (top view in exaggerated scale) and FIG. 4(B) (fragmentary side elevational view of a part of FIG. 4(A)). 27c is a rectangular hole. At its one short side, an abutment piece 27d is bent up. An extension 3 is formed by bending loading ring 1 and engages in the rectangular hole 27c (see FIG. 5(A)). In conclusion, when the loading ring 1 rotates, the second guide post unit 20 and the follow-up ring 6 are caused to rotate in drawn relation by the loading ring 1 since the extension 3 and the rectangular hole 27c are maintained in engagement with each other until the second guide post unit 20 is caught by a means to be described later. During this time, the phases of rotation of the first and second arms 20a and 20b are limited as follows: That is, the first arm 20a is provided with a stopper as will be described later so that the second arm 20b cannot further rotate from the position of FIG. 3(A) in the counterclockwise direction. Thereby, under the action of the aforesaid torsion coil spring, the cam 20e on the free end of the second arm 20b is urged to abut on the cam provided in the outer periphery of the guide ring 48. Thus, the clockwise rotation of the arms 20a and 20b is limited. By this, the position of the second guide post unit 20 is regulated by the guide ring 48 until that unit 20 is conducted to the catching structure as will be described later.

The first catching structure 30 is arranged in fixedly secured relation to the body of the device.

The second catching structure 40 is arranged in fixedly secured relation to the body of the device and is constructed with a cam 41, a catcher 42 and guides 43 and 44 as the main elements.

The cam 41 is rotatably mounted on a shaft 45 and urged by a torsion coil spring 47 in a direction of arrow C shown in FIG. 3(A) to abut on the sleeve of the loading ring 1 A cam 46 is connected to the loading ring 1 so that as the loading ring 1 rotates, its camming surface 46a abuts on a camming surface 41c of the cam 41. Hence, the cam 41 is caused to rotate in a direction of arrow D of FIG. 3(B) Another camming surfaces 41a and 41b cooperate with the guides 43 and 44 to bring the second guide post unit 20 toward the catcher 42 as they rotate. The catcher 42 when in contact with the second guide post unit 20 carries out catching of the unit 20.

In the unload position of FIG. 3(A), when a loading motor (not shown) is switched on to start loading of the record bearing medium, rotation of that motor is transmitted through intermediary such as a gear train of known construction to the geared portion of the loading ring 1. Therefore, the ring 1 starts to rotate in the direction of arrow A along with the first guide post unit 10. At this time, by the engagement of the extension 3 of the loading ring 1 in the rectangular hole 27c of the hook 27 within the second guide post unit 20, the second guide post unit 20 and the follow-up ring 6 too are rotated in the aforesaid direction of arrow A in drawn relation by the loading ring 1.

As the aforesaid rotation goes on, when the cam 46 connected to the loading ring 1 abuts on the cam 41 as shown in FIG. 3(B), the cam 41 is then rotated in the direction of arrow D by the camming surface 46a, and the camming surface 41b is opened and readied to conduct the second guide post unit 20. Upon further rotation of the loading ring 1, the cam 41 drops on the camming surface 46b as shown in FIG. 3(C), the opened portion of the cam 41 is narrowed so that the arm 20b of the second guide post unit 20 is called in to the catcher 42 side by the camming surface 41b. In such a manner, a preliminary catching is performed. At the same time, an upward slant portion 27e (see FIG. 5(A)) of the front end of the hook 27 within the second guide post unit 20 rises by its own resiliency along a downward slant portion 44d (not shown in FIG. 3(A)) provided as a unit with the guide 44 and rides on a flat portion 44e (see FIG. 5(B)). Therefore, the hook 27 is disengaged from the extension 3 of the loading ring 1, permitting the loading ring 1 alone to continue rotating in the direction of arrow A.

Figure 3D:
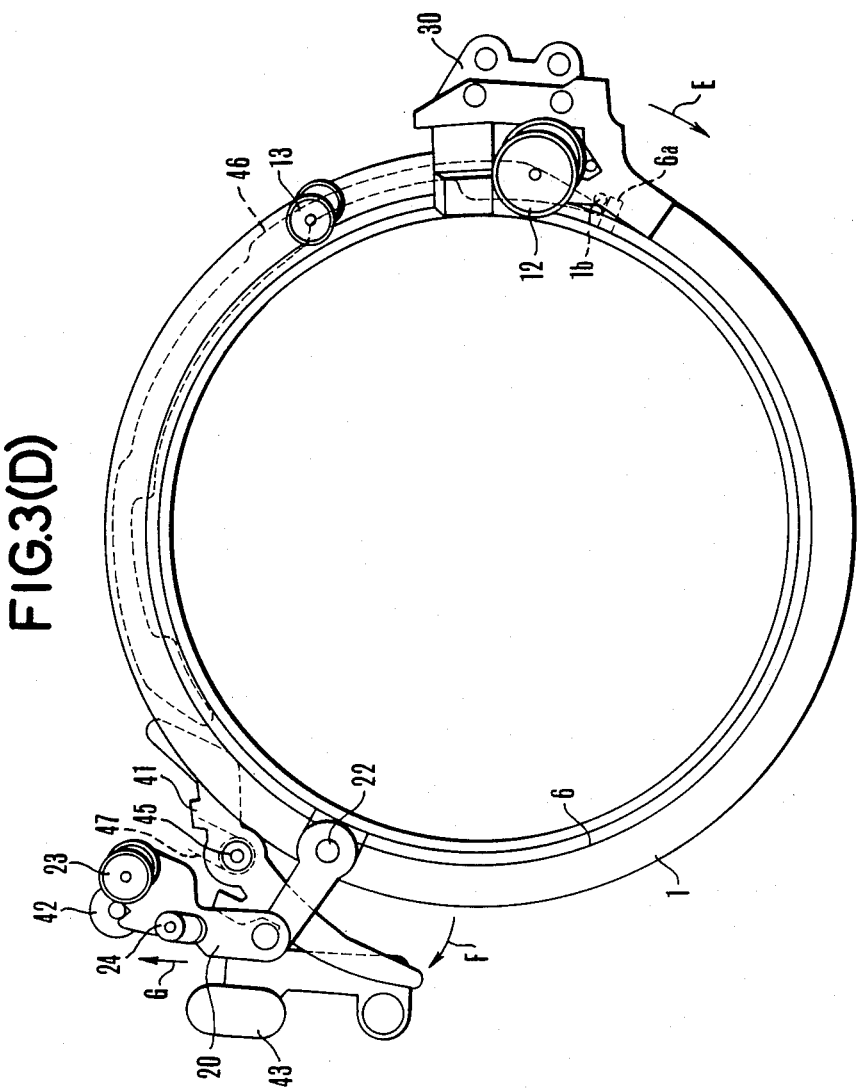

As the loading ring 1 further goes on rotating, when the first guide post unit 10 reaches the position of the first catching structure 30 as shown in FIG. 3(D), the first guide post unit 10 contacts on the first catching structure 30 and is caught. The loading ring 1 continues rotating until the protuberance 2 moves away from the hole 11, while further charging the spring 49 to exert a pressure of the direction indicated by an arrow E in FIG. 3(D). The catching of first guide post unit 10 is ensured by its force. Also, the second guide post unit 20 is pushed deeper and pressed on the catcher 42 by the rotation of the loading ring 1 with its projection 1b in abutting engagement on a projection 6a of the follow-up ring 6. After that, by the cam 46, the cam 41 is rotated in a direction of arrow F shown in FIG. 3(D), and the catching of the second guide post unit 20 is strengthened by the spring 47 urging it in a direction of arrow G.

In such a structure, if something wrong, for example, an abnormal increase of the tension of the tape, has happened in the middle of the loading course as in the position of FIG. 3(B), the hook 27 will be disengaged from the extension 3. Then, the second guide post unit 20 is left behind. But, the second guide post unit 20 soon proceeds to rotate since the further advance of loading brings the projection 1b of the loading ring 1 into contact with the projection 6a of the follow-up ring 6 and rotates the follow-up ring 6.

Such engagement of the projection 1b of the loading ring 1 with the projection 6a of the follow-up ring 6 causes the second guide post unit 20 to approach the cam 41. In this time, the cam 41 is in dropping on the camming surface 46 described above so that a half-opened state (normally the aforesaid preliminary catching state) occurs as shown in FIG. 3(C). In this case also, therefore, the second guide post unit 20 can be conducted toward the second catching structure 40.

When to unload the tape, the aforesaid loading motor rotates in the reverse direction to that when loading, and the loading ring 1 also rotates in the reverse direction to the aforesaid one. And, when the extension 3 of the loading ring 1 comes to contact with the abutment piece 27d of the hook 27 and pushes it, the hook 27 is returned by its resiliency to the initial position shown in FIG. 5(A), then the extension 3 engages in the rectangular hole 27c of the hook 27 and then the follow-up ring 6 and the second guide post unit 20 are again drawn to rotate by the loading ring 1, returning to the positions shown in FIG. 3(A).

In the tape loading device of the character described above, it is until the second guide post unit 20 is guided to the catching structure 40 that the operative connection between the loading ring 1 and the follow-up ring 6 is performed by means of the extension 3 and the hook 27, and it is after this operative connection has been released that the approach followed by the operative connection of the first guide post unit 10 with the catching structure 30 is performed by means of the projections 6a and 1b. Due to the direct unity of the projections 6a and 1b with the follow-up ring 6 and the loading ring 1 respectively, the relative timing of conducting and pressing both guide post units 10 and 20 to and against the catching structures 30 and 40 respectively can very accurately be defined in phase. This allows the pressing of both guide post units against the respective catching structure to be carried out simultaneously by using the driving power of the loading motor. Therefore, it becomes very reliable and strong.

Another feature of the invention as in the tape loading device described above is that the path of movement of the second guide post unit 20 till the start of its guiding by the catching structure 40 is determined by the guide ring 48. Since this guide ring 48 serves as the guide rail for guiding the first guide post unit 10, there is no need to use an additional member which would otherwise necessary only to define the path of movement for the second guide post unit 20. Thus, it has been made possible to reduce the number of constituent parts and the weight of the device.

Figure 1:
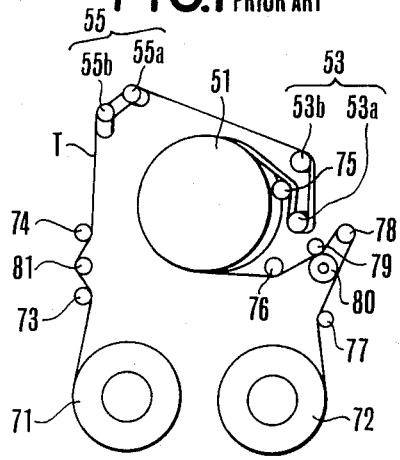
FIG. 1 is a schematic top view illustrating an example of the tape running system of recently developed VTRs.
Figure 2:
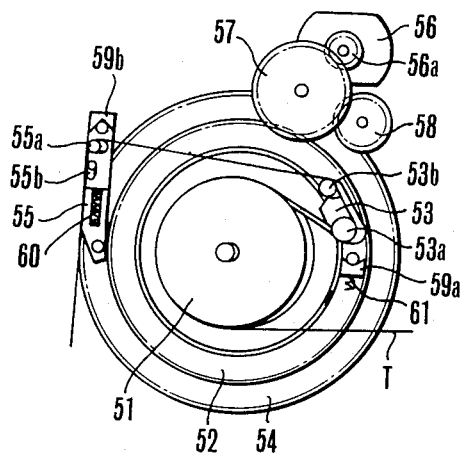
FIG. 2 is a top view illustrating the construction and arrangement of the main parts of the loading device for establishing the running system of FIG. 1.

Still another feature of the invention in the illustrated embodiment of the tape loading device thereof is that it is when the second guide post unit 20 is guided to the catcher 42 that the cam 41 is operated by the cam 46 provided on the loading ring 1, and it is then when the second guide post unit 20 is pressed on the catcher 42 that the bias spring 47 is operated by the later rotation of that cam 41. Therefore, the cam 41 as the guide member with the help of the action of the spring 47 and the cam 46, when the second guide post unit 20 has approached it, rotates it until the guide-possible position, and the spring 47 and the cam 46 are then switched to press the second guide post unit 20 on the catcher 42. Hence, these parts suffice for performing all the operations which would otherwise be made by the individual means for guiding the guide post unit 20, moving the guiding means, and pressing the guide post unit 20 onto the catcher 42 as in the prior art. Thus, it is made possible to reduce the number of constituent parts and the weight of the device A further feature of the invention in the illustrated embodiment of the tape loading device is that since the pressing of the second guide post unit 20 on the catcher 42 is effected by the cam 41 that rotates by the cam 46 provided on the loading ring 1, because the pressure to the catcher 42 is obtained by the spring 47, even if the bias force of this spring 47 is made sufficiently strong, the drive load on the loading and follow-up rings 1 and 6 is, therefore, not so much increased. Therefore, as compared with the conventional tape loading device such as that shown in FIG. 2, the loading motor may be reduced in size and weight.

Figure 6A:
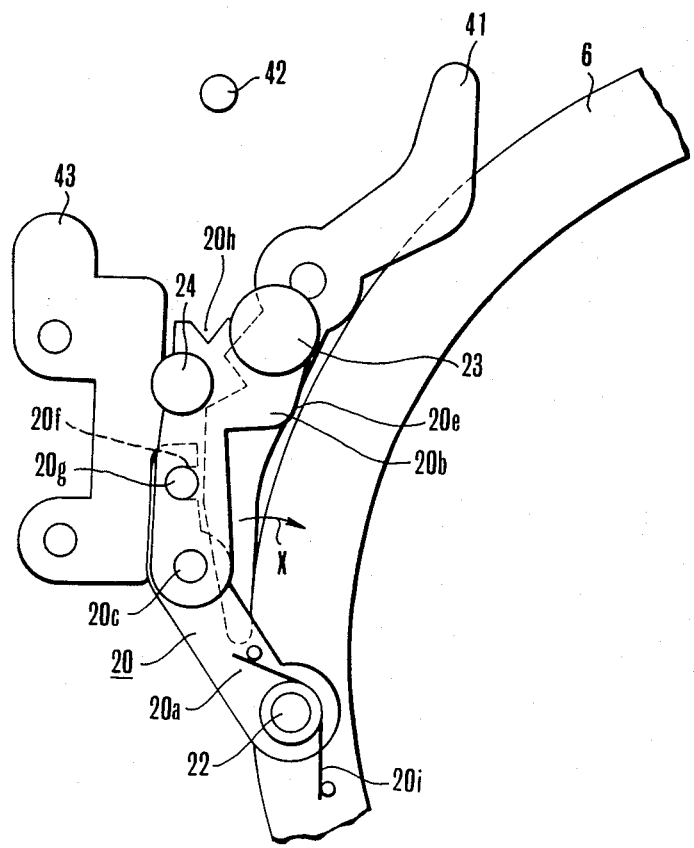
FIGS. 6(A) and 6(B) are fragmentary top views in exaggerated scale illustrating the detailed structure of some of the parts shown in FIG. 3(A).
Figure 6B:
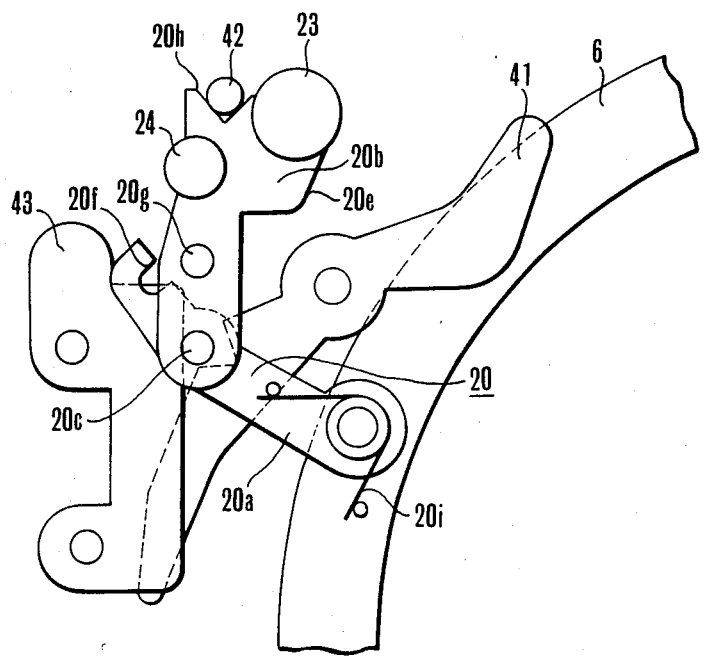

FIGS. 6(A) and 6(B) illustrate the details of the structure of the important ones of the parts of FIG. 3(A). In the figure, the similar constituent parts to those shown in FIG. 3(A) are denoted by the same numerals.

In FIGS. 6(A) and 6(B), a boss 20g is planted on the lower surface of the arm 20b to limit a range of rotation of the arm 20a relative to it. Again, the arm 20a is urged by a spring 20i always in a direction of arrow X. With the boss 20g when engaged in a recess 20f of that arm 20a, both arms 20a and 20b are urged as a unit in the direction of arrow X in the figures. FIG. 6(A) illustrates a state before the aforesaid guide post unit 20 is conducted to the catcher 42 by the cam 41. That is, the combined attitude of the arms 20a and 20b is similar to that when they are in the aforesaid motion and positioned inside the opening portion of the cassette In this state, the second arm 20b is rigidly supported on the first arm 20a because the supporting is effected at two points or by the pivot pin 20c and the boss 20g. In reaction to the pressure under which the arm 20a abuts at its side edge 20e on the aforesaid guide ring 48, these parts are maintained unified when moving. When the follow-up ring 6 is driven to rotate in the clockwise direction as viewed in the figures, the guide post unit 20, while being conducted by the guide 43 and the cam 41, moves until its recess 20h abuts on the catcher 42.

FIG. 6(B) illustrates a state in which the aforesaid movement has ended, or the guide post unit 20 has been catched. In this state, the position of the guide post unit 20 is determined by the combination of the catcher 42, the guide 43 and the cam 41 urged in the clockwise direction. It is in this state that the recess 20f of the arm 20a is disengaged from the location boss 20g. Therefore, the two arms 20b and 20a are connected to each other at only one point or by the pivot pin 20c alone, being freely rotatable relative to each other.

In the above-described embodiment of the tape loading device, the second arm 20b, when lying in the opening of the cassette and moving for loading, is restrained from rotation relative to the first arm 20a by the 2-point support, but when in catching, because its being switched to the 1-point support, is rendered rotatable. This produces the following advantages:

When the guide posts 23 and 24 lie in the opening portion of the cassette, or move, the relation of the two arms 20a and 20b is in good stability. For this reason, it is relatively easy to assure the sufficient accuracy of adjustment of the position of the guide posts 23 and 24. In the past, when the cassette was inserted into a chamber therefor in the VTR, the equivalent guide posts to those 23 and 24 were liable to hit the walls forming the opening portion of the tape cassette or strike the tensioned loop of the tape, or when the tape were transported back and forth, the tape was often taken out of the normal path. According to the invention, the probability of occurrence of such accidents which lead to tear the tape or the like can be reduced remarkably.

Also, when to locate the guide post unit 20 by the catching member, the two arms 20a and 20b are rendered freely rotatable about only one pivot point relative to each other, the influence due to the difference of the stop position of the loading ring 1 from item to item can be absorbed by the abutting engagement on the catching member. Therefore, it is possible to assure a very high accuracy of location control of the guide post unit 20 by the catcher 42. Also, at this time, no unduly large stress is given to the catching, giving another advantage of preserving the good accuracy of location for a long time.

What is claimed is:

1. A loading device for loading a tape-shaped record bearing medium onto a transducing member to carry out a transducing operation, comprising
    (a) a first guide post unit including a guide post for guiding a tape-shaped recording medium;
    (b) a second guide post unit including a guide post for guiding the tape-shaped medium;
    (c) a first rotary member for moving said first guide post unit between a first unloading position where said first guide post unit is out of contact with said tape-shaped record bearing medium and a first loading position;
    (d) a second rotary member for moving said second guide post unit between a second unloading position where said second guide post unit is out of contact with said tape-shaped recording medium and a second loading position,
    said tape-shaped recording medium being arranged to be loaded onto said transducing member to carry out said transducing operation when said first guide post unit is in said first loading position and said second guide post unit is in said second loading position;
    (e) drive means for driving said first rotary member; and
    (f) connection controlling means for controlling physical connection of said first rotary member with said second rotary member, said connection controlling means being arranged to physically connect said first rotary member with said second rotary member when said first guide post unit is positioned near said first unloading position and to release physical connection of said first rotary member with said second rotary member at least once during movement of said first guide post unit from said first unloading position to said first loading position.

2. A device according to claim 1, wherein said first and second rotary members are ring-shaped and said first and second rotary members are arranged to be in substantially concentric relation with each other and to be rotatable.

3. A device according to claim 2, further comprising: first and second locating means for locating said first and second guide post units in said first and second loading positions, respectively.

4. A device according to claim 2, wherein said connection controlling means is arranged to release the physical connection of said first rotary member with said second rotary member when said second guide post unit has reached a position near said second locating means.

5. A device according to claim 3, wherein said connection controlling means is arranged to physically connect again said first rotary member with said second rotary member when said first guide post unit has reached a position near said first locating means.

6. A device according to claim 1, wherein said first rotary member and said second rotary member rotate in a same direction when said connection controlling means has physically connected said first rotary member with said second rotary member.

7. A loading device for loading a tape-shaped record bearing medium onto a transducing member to carry out a transducing operation, comprising:
    (a) a first guide post unit including a guide post for guiding a tape-shaped recording medium;
    (b) a second guide post unit including a guide post for guiding the tape-shaped recording medium;
    (c) a first rotary ring for moving said first guide post unit between a first unloading position where said first guide unit is out of contract with said tape-shaped recording medium and a first loading position;
    (d) a second rotary ring for moving said second guide post unit between a second unloading position where said second guide post unit is out of contact with said tape-shaped recording medium and a second loading position,
    said tape-shaped recording medium being arranged to be loaded onto said transducing member to carry out said transducing operation when said first guide post unit is in said loading position and said second guide post unit is in said second loading position;
    (e) drive means for driving said first rotary ring; and
    (f) connection controlling means for controlling physical connection of said first rotary ring with said second rotary ring, said connection controlling means being arranged to change over physical connection and physical non-connection of said first rotary ring with said second rotary ring at least twice during movement of said first guide post unit from said first unloading position to said first loading position.

* * * * *

UNITED STATES PATENT AND TRADEMARK OFFICE
CERTIFICATE OF CORRECTION

PATENT NO. : 4,873,591
DATED : October 10, 1989
INVENTOR(S) : Takashi Kimura; Toshiya Yatomi; and Hiroo Edakubo It is certified that error appears in the above-identified patent and that said Letters Patent is hereby corrected as shown below:

```
Item [30], change "61-20214" to -- 61-202014 --
Col. 5, line 3, after " 10" insert -- . --
Col. 5, line 38, after "ing" insert -- up from the --
Col. 6, line 1, after "l" first occurrence insert
    -- . --
Col. 7, line 51, after "otherwise" insert -- be --
Col. 8, line 34, after "cassette" insert -- . --
Col. 9, line 3, change "were" to -- was --
Col. 9, line 28, after "tape-shaped" insert
    -- recording --
```

Signed and Sealed this

Eleventh Day of September, 1990

Attest:

HARRY F. MANBECK, JR.

*Attesting Officer*       *Commissioner of Patents and Trademarks*